(12) United States Patent
Sonnenberg

(10) Patent No.: US 7,160,445 B2
(45) Date of Patent: Jan. 9, 2007

(54) DECORATIVE POND SYSTEM

(76) Inventor: Rick Sonnenberg, 2612 E. Powerline Rd., Nampa, ID (US) 83687

(*) Notice: Subject to any disclaimer, the term of this patent is extended or adjusted under 35 U.S.C. 154(b) by 58 days.

(21) Appl. No.: 10/801,984

(22) Filed: Mar. 15, 2004

(65) Prior Publication Data
US 2004/0226870 A1   Nov. 18, 2004

Related U.S. Application Data

(60) Provisional application No. 60/454,904, filed on Mar. 14, 2003.

(51) Int. Cl.
  *B01D 24/00* (2006.01)
  *B05B 17/08* (2006.01)
  *C02F 3/06* (2006.01)
(52) U.S. Cl. .......... 210/167; 210/170; 210/416.1; 239/20
(58) Field of Classification Search .......... 210/167, 210/220, 232, 416.1; 239/17, 20
See application file for complete search history.

(56) References Cited

U.S. PATENT DOCUMENTS

| | | | | |
|---|---|---|---|---|
| 3,727,769 A | * | 4/1973 | Scholl | 210/484 |
| 6,041,738 A | * | 3/2000 | Hemauer et al. | 119/226 |
| 6,290,844 B1 | * | 9/2001 | Tennyson, Jr. | 210/169 |
| 6,461,501 B1 | * | 10/2002 | Porter | 210/167 |
| 6,527,949 B1 | | 3/2003 | Hedberg et al. | |
| 6,685,826 B1 | | 2/2004 | James | |
| 6,712,960 B1 | * | 3/2004 | Freeman | 210/169 |
| 6,821,416 B1 | * | 11/2004 | Kelly et al. | 210/167 |
| 6,843,910 B1 | * | 1/2005 | Thomas | 210/167 |
| 2003/0038073 A1 | * | 2/2003 | Fall et al. | 210/315 |
| 2004/0047145 A1 | * | 3/2004 | Koren | 362/101 |
| 2004/0182765 A1 | * | 9/2004 | Mauro et al. | 210/169 |
| 2005/0161380 A1 | * | 7/2005 | Crawford, III | 210/170 |

FOREIGN PATENT DOCUMENTS

DE          3733688      *  4/1988
DE     2004013617 U1   * 12/2004

* cited by examiner

*Primary Examiner*—Fred G. Prince
(74) *Attorney, Agent, or Firm*—Derek H. Maughan; Stephen M. Nipper; Dykas, Shaver & Nipper, LLP

(57) ABSTRACT

An improved outdoor aquatic pond having a installation template, a pond liner, a plenum unit chamber, a pump, a canister filter, and at least one artificial rock for connection with the rim of said pond. This invention provides for increased ease of installation as well as increased ease of maintenance.

10 Claims, 7 Drawing Sheets

DECORATIVE POND SYSTEM

PRIORITY

This application claims priority from a provisional patent application entitled DECORATIVE POND INSTALLATION SYSTEM, having the same inventor filed on Mar. 14, 2003, and identified by application Ser. No. 60/454,904 the contents of which are herein incorporated by reference.

DESCRIPTION

Background Of The Invention

1. Field of the Invention

The present invention generally relates to decorative ponds, and more particularly to a pond installation kit system that provides increased ease of placement and installation, improved filtration, and cost effective preparation. The present invention also allows for a system that is simple to maintain.

2. Background Information

Many different types and styles of artificial outdoor aquatic ponds are known in the prior art. These types of devices have become increasingly more popular in recent times and have become a desired feature of many persons. Typically, these devices are labor intensive to set up and require a variety of tools such as heavy equipment to install and thus are costly to install and maintain. Furthermore, once in place these ponds must be maintained, cleaned, and monitored in order to maintain these ponds in a proper working order. Without proper maintenance or installation, a variety of problems may arise. These ponds may leak, become overgrown with algae or bacteria or in other ways become unsightly and/or dangerous. Therefore what is needed is an improved outdoor aquatic pond that is easy to install, provides desired aesthetic features, and provides a filtration system that is easy to operate and maintain. What is also needed is a device that provides all of these features and allows for trouble free maintenance of the system.

Therefore, it is an object of the present invention to provide a pond set up kit that allows a user to simply and easily install a decorative pond in a desired location. Another object of the present invention is to provide a pond set up kit that includes an underwater plenum that assists to provide pressurized water to fountains and other water outlets. Additionally, the present invention provides an underwater filtration system that filters water through the pond. Another object of the present invention is to provide a preassembled pre-filter and skimmer that can be easily maintained in a desired position and location. Another object of the present invention is to provide a device that allows for easy transport and set up of the various features of the pond. Another object of the present invention is to provide a pond set up that can be easily maintained with a minimum amount of expertise or expense required. Another object of the present invention is to provide all of the above features that can be manufactured in a low cost manner while still providing the desired results to the user.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention is an improved outdoor aquatic pond that is easy to install and maintain. In one embodiment of the present invention, the pond is sold as a kit to be assembled by a purchaser. In other embodiments, the invention can be sold as one unitary piece or as individual pieces and used in a variety of locations, including in conjunction with existing ponds. The present invention includes a plurality of features that are novel and unique and provide significant advantages over items that exist in the prior art. The principal features of the present invention includes a pump, a pre-filter and skimmer, a pressure providing plenum, an underwater filtration system, a pond liner having a bottom that is shaped to have a desired configuration, and a plurality of artificial rocks that provide for various aesthetic and functional features to the pond.

The items are provided with various features and functions that allow for increased functionality. The pond liner is also colored green so as to have a more desired natural appearance. The pond liner is manufactured from a light resistant polymer. This pond liner includes and defines a cavity configured to hold a plenum and a filtration insert into the bottom of the device. This plenum is connected to a pump, a pre-filter, and a skimmer. The pump, pre-filter, and skimmer are configured to push water into the plenum, thus pressurizing the plenum and allowing for water to be transported to various outlets through water pressure rather than by additional pumping mechanisms.

A filter is configured to fit within the plenum and define a variety of chambers in which a filter material, including a shredded plastic filter material is placed within the filter. When in use, the filter is covered by a lid or cover and is located under the water that is located within the pond. Aerated water is siphoned from a portion of the pump output, mixed with air through a venturi, and injected into the filter. The chambers of the filter are interconnected by passageways and allow the flow of this aerated water through the filter. The chambers of the filter contain materials that provide adequate surface area for nitrifying bacteria to proliferate and colonize. The shape of the walls that separate the chambers are configured so as to cause the flow of water through the device to rotate and circulate so as to form eddies, which slow the rate of the water passing through the filter and allow for increased interaction of the bacteria with the materials suspended in the water. After the water has passed through the filter, the water escaped into the pond above the cover. The pond is defined by the liner and the cover and is surrounded by various pieces of decorative rockwork. This rockwork contributes to the various aesthetic features of the pond by providing cover for fish, as well as convenient access to persons wishing to become close to the water.

The water in the pond is configured to be sucked and pulled through a skimmer and a pre-filter which have various devices for mechanically breaking down various materials that may become suspended within the water. The capacity of the pump compared to the capacity of the pond completely circulates all of the water through the system five or six times on the average per hour. This rate of filtration combined with the mechanical breakdown, the aerated filtration system, and the structure of the filters themselves provide increased ease of maintenance and increases the efficiency of the existing natural processes so as to maintain the pond as a clean living ecosystem.

This system is also made of materials that are manageable by persons of average abilities and does away with the necessity of providing heavy equipment to dig the earth, move the stones or mix concrete as may have been required by various other pond installation systems that exist in the prior art. This system also contains pieces constructed utilizing modem plastic forming techniques to create devices that have pre-formed passageways and recesses with them. These preformed passageways and recesses allow various other portions of the pond system such as the preassembled pre-filter and pump device to be snapped and positioned into a desired position and orientation, and eliminates the need for additional tubing or pumps to be added to these devices. These features also allow the pond to be more easily set up and maintained.

The purpose of the foregoing abstract description is to enable the United States Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measure by the claims, nor is it intended to be limiting as to the scope of the invention in any way.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive in nature.

DESCRIPTION OF THE PREFERRED EMBODIMENTS

Figure 1:
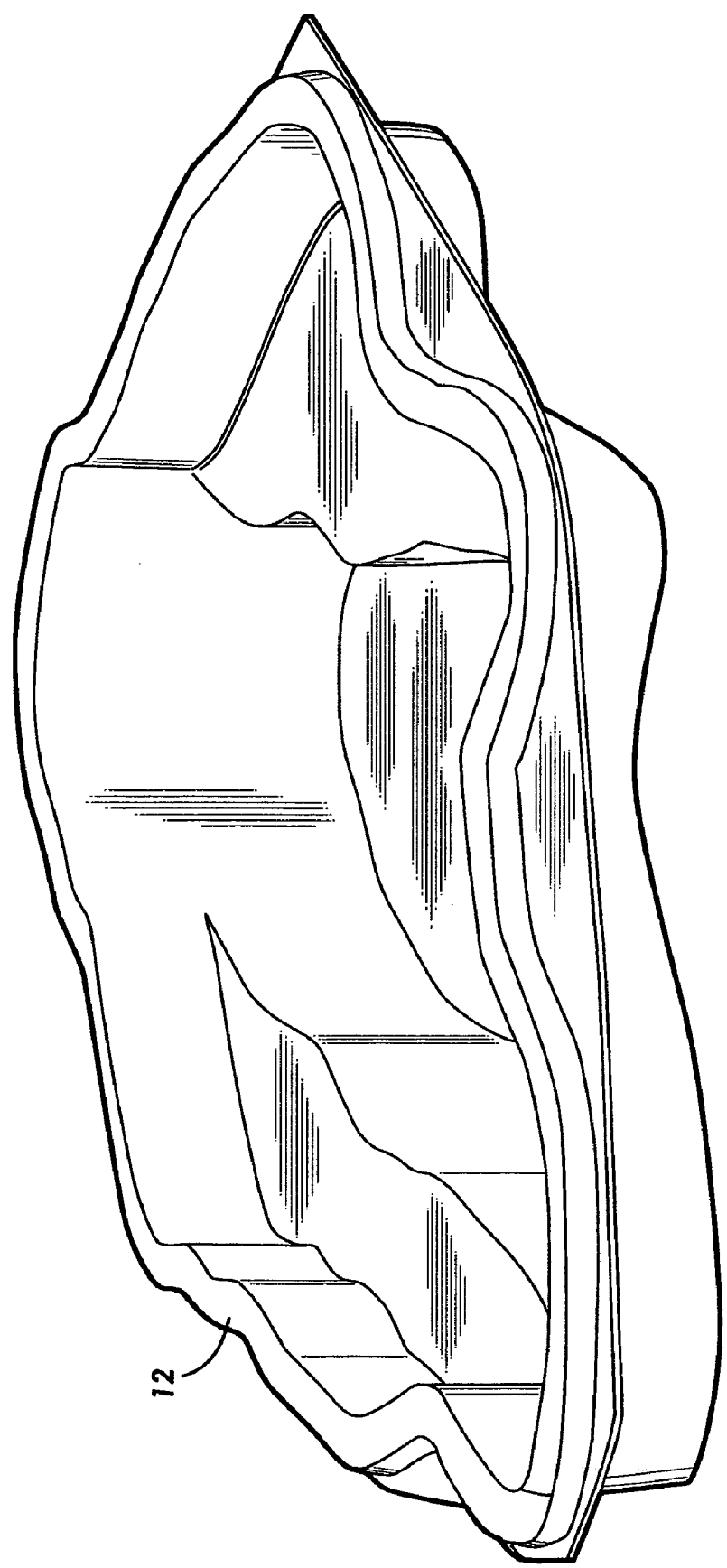
FIG. 1 is a perspective view of one embodiment of a pond liner of the present invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The present invention is an improved decorative garden pond. Preferably, the present invention is sold as a kit, complete with artificial rocks, digging template, video, pump, filtration, and everything that a person would need to place and prepare such a pond. However, it is to be understood that the invention is not limited to this embodiment and that various modifications and alternative constructions are also within the scope of the invention. Therefore, while the present invention is described in the context of a kit that is sold for ready assembly. It is to be distinctly understood that the invention is not limited to this kit but is drawn to the various novel features that are described and claimed in the following disclosure.

The invention is comprised of the following features that together form a decorative pond installation kit. Referring now to FIGS. 1–6, various views of the present invention are shown. FIG. 1 shows a pond liner 12. Many different styles of pond liners 12 exist on the market today. In this invention, the exact shape of the pond liner 12 may be varied so as to meet the necessities and expectations of a user. These pond liners 12 typically have at least one edge that forms a ledge or rim that extend around the liner. These pond liners 12 form a foundation and a shaped base upon which the other features of the present invention are added. This pond liner 12 is typically supported on a stand, among decking, or inserted into the ground depending upon the needs and preferences of the user.

In the preferred embodiment, the pond liner 12 is made of plastic material that is the same color as the desired portion of the pond, namely green rather than black as is shown in many prior art embodiments. Additionally, the plastic used to form the pond liner 12 is of a sufficient strength so as to allow the pond to maintain a desired shape even when water and other items are added to the pond. This green color holds less heat and provides various aesthetic qualities to the device. The plastic that the device is made from is a UV stabilized plastic that is formulated to provide protection against various forms of plastic oxidation and breakdown including free-light radicals and hindered amines. The plastic is also configured to be resistant to extreme temperature variations, as well as prolonged exposure to cold weather. The pond liner 12 is configured to match a cover 34 shown in FIG. 5, which is configured to cover the plenum (14 shown in FIG. 2) and the underwater filter (16 shown in FIG. 2) when the device is in use. This combination of the liner 12 and cover 34 form the base of the pond, which will be filled with water from the attached pump 18 (shown in FIG. 5).

In the preferred embodiment, the liner 12 is configured to provide various habitat features for the various organisms that are held within the pond. These include various portions that may be configured to provide shelter, spawning habitat, feeding sections or other features according to the desired and necessities of the user. Additionally, the size of the pond may be varied according to the needs of the user with the other respective portions, plenum 14, underwater filter 16, pre-filter 22 and pump 18 all appropriately dimensioned and sized to allow the advantages of the present system to adequately function.

The liner 12 is molded so that the bottom portion of the liner includes a space sufficient to hold a plenum therein. In the preferred embodiment, the device is roto-molded rather than vacuum formed. This provides a liner 12 with increased strength as compared to other liners and allows the material of the liner to be more resistant to cold and heat and to be less likely to leak. Additionally, the present invention has increased strength compared to other devices and a thicker wall panel. While in the prior art a typical pond liner may have a thickness of about 200 millimeters, the present invention has a thickness of about ⅜ of an inch. As will be described further, the plenum provides a reservoir of pressurized water to feed fountains and other features, while a separate underwater filter 16 fits within the plenum and filters aerated water as it passes over the plastic frass material located within the filter device. Depending upon the exact necessities of the user, the liner 12 may also be configured to define various passageways for connection with or to allow the passage of water passage conduit throughout the liner 12.

In an embodiment where the pond of the present invention is to be installed within the ground, support for the liner 12 is provided by digging a hole of a sufficient size within the earth. In the instance where a kit is provided, a template such as a piece of plastic or paper may be utilized to mark the defining areas that will outline the size of the opening that must be made to allow insertion of the liner into the earth. A user would lay out a template showing a first hole to dig. The user would then outline that template on the ground and dig a hole the size of that template. The template may be attached to the ground through use of a plurality of pins. The user would then lay out and outline a second template after which the user would then dig a second hole.

After digging (in example) at eight inches deep within that general shape, the user would then be instructed to lay out the second template defining the main portion of the pond 4 and instructed to dig that hole and then at an additional twenty inches deep to arrive at the shape necessary for installation of the pond liner in the ground. Upon digging the required holes, the pond liner could be placed within the hole. In other embodiments, support for the pond liner may be provided by bricks, lumber or other materials that may be placed beneath the pond liner so as to support the pond liner and the remaining portions of the pond as well.

Such a pond liner 12 defines a space adapted to receive a plenum 14 and an underwater filter 16 therein. In some configurations, that plenum 14 could also be formed as a part of the pond liner itself. However in the preferred embodiment, the plenum 14 is a removable unit that is configured to fit within the liner. Additionally, the plenum 14 and the liner 12 combination may also be configured and sold separately for use as an add-on product with other existing liners.

Figure 2:
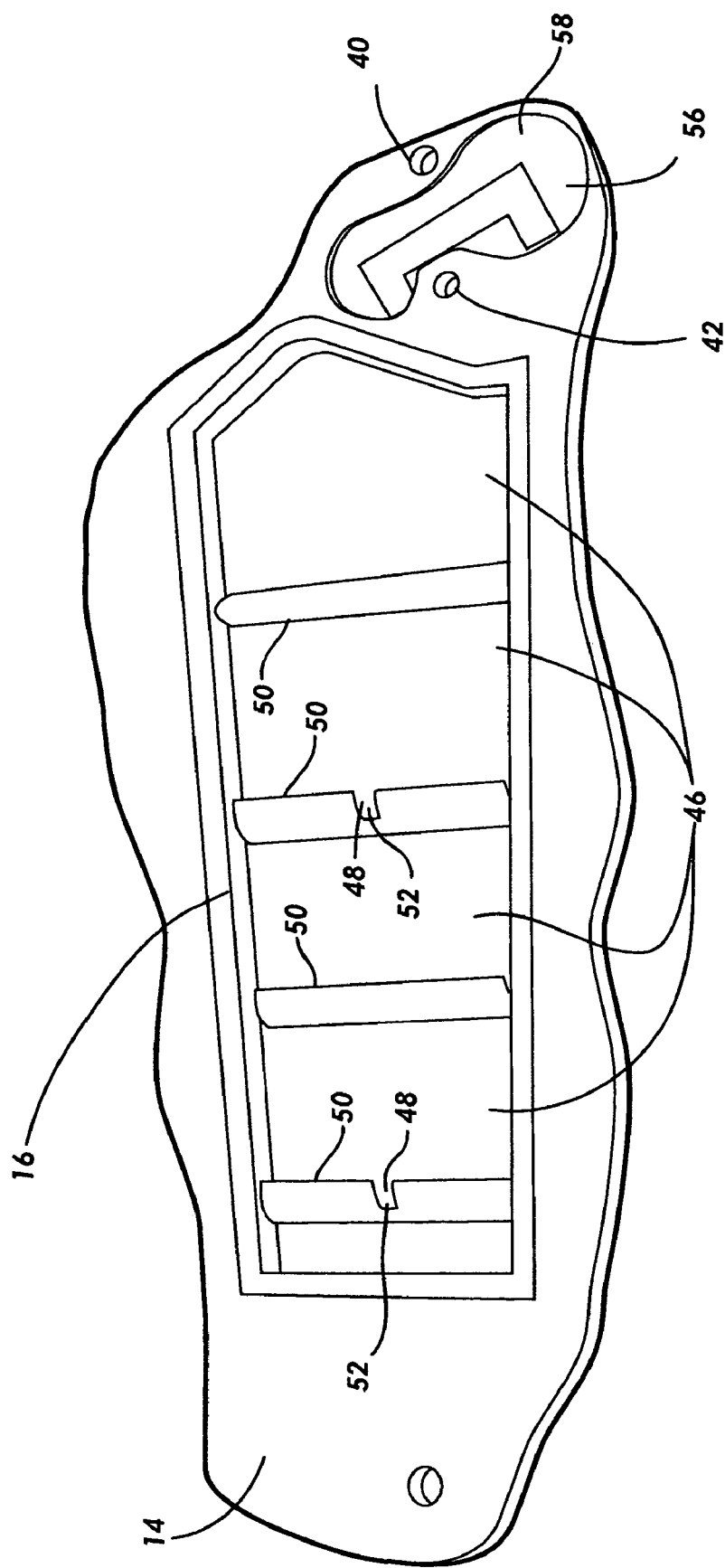
FIG. 2 shows one embodiment of a plenum and filter unit for insertion into the bottom of a pond.
Figure 3:
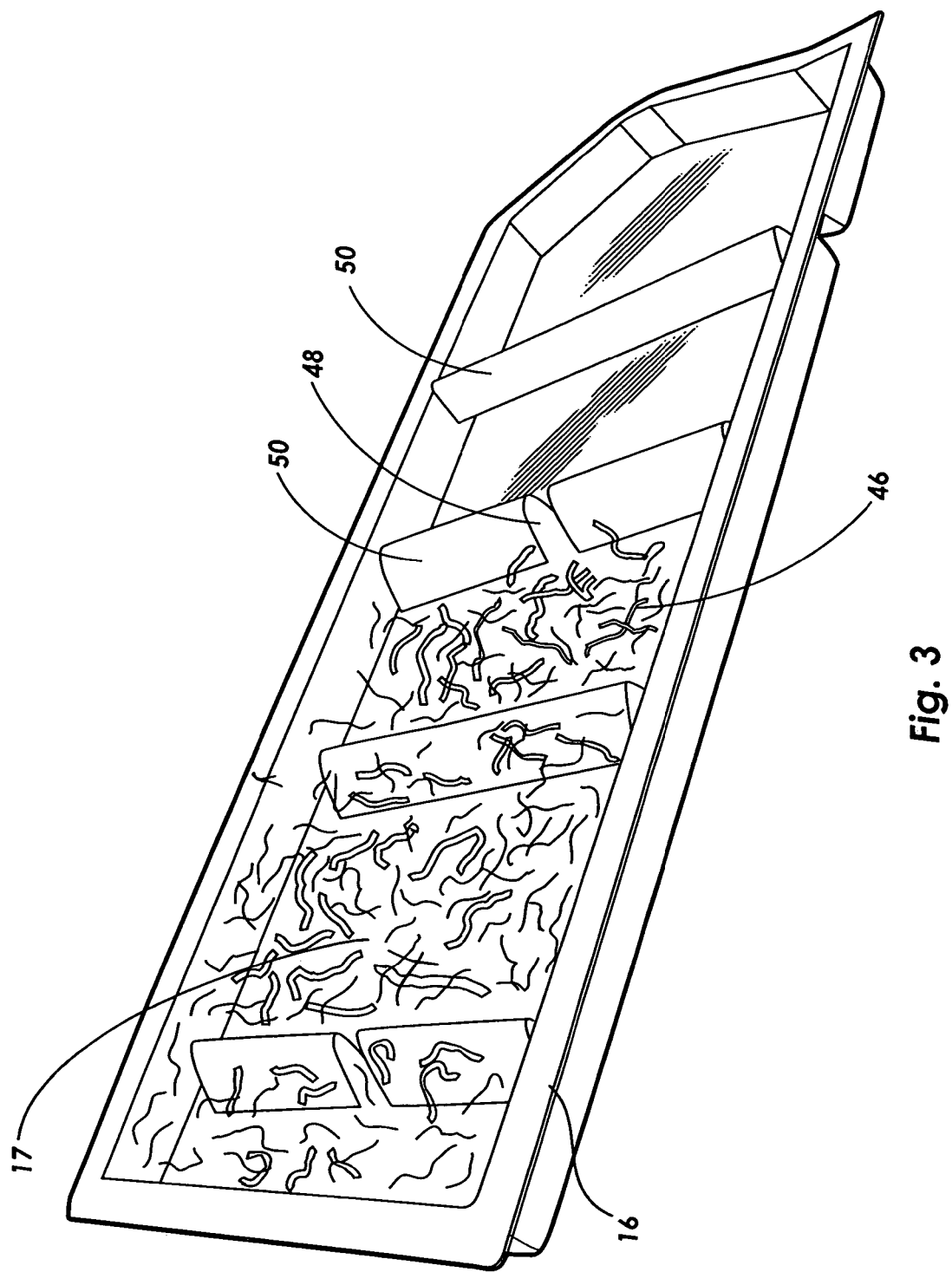
FIG. 3 shows a partial detailed perspective view of the filter unit of FIG. 2.
Figure 4:
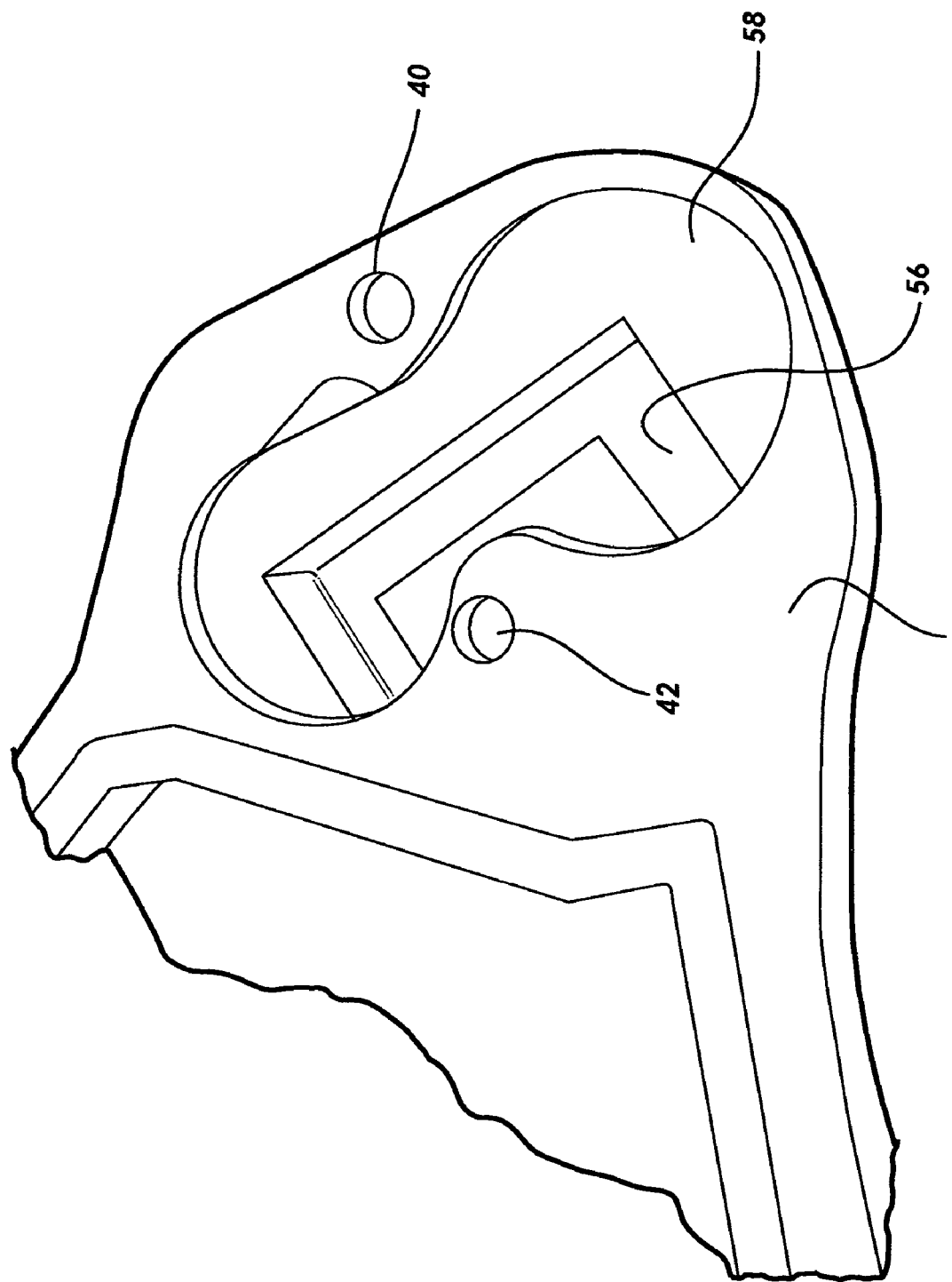
FIG. 4 shows a partial detailed perspective view of the plenum unit of FIG. 2.

FIGS. 2–4 show various views of one embodiment of the plenum 14 of the present invention. The plenum 14 is a molded piece of plastic that is configured to fit within the bottom portion of the pond liner. The plenum 14 contains a portion configured to receive a removable filter 22 and pump unit 18 therein and forms an entrance opening and at least one exit opening. In the preferred embodiment, the plenum 14 contains two exit openings 40, 42 one of which is configured to connect to a transport conduit 38 to conduct water from the plenum 14 to a waterfall or other water feature, while the other exit hole is configured to allow water to pass into the pond portion 44 of the unit. The plenum 14 is made of a semi-rigid material that defines an internal reservoir into which the pump 18 pumps water. The constant inflow of water into a container (plenum 14) having a fixed size increases the pressure within the plenum 14 and enables water to be pushed through apertures 40, 42 in the plenum into a variety of distant locations. This eliminates the need for additional pumping devices to be included and assists in the simplicity of the present invention.

The plenum 14 is also configured so as to allow placement of a filter 16 within the plenum. When the actual pond is in use, this filter 16 sits beneath a cover 34, which is below the surface of the water within the pond. Therefore, it is referred to as an underwater filter. This underwater filter contains a plurality of chambers 46 that are configured for interconnected water flow by filter chamber channels 48 within the walls 50 that define the channels 48. These channels 48 and walls 50 are positioned so as to impede the flow of water through the filter 16 and to cause eddies to form in these various chambers. These eddies slow the flow of water through the device and cause rotation of the flow of water through these chambers 46. This allows more of the water to flow through the filter media and for more of the nitrites and other materials to be filtered out of the water.

Within the filter 16 itself, a first wall divider 50 is positioned so as to form a vertical ridge through which water proceeds over, the second ridge 50' is slightly curled with a notch 52 in the middle to create turbulence in the water as water travels through the filter unit 16, the third and fourth dividers 50", 50''' are likewise slightly curved back towards the pump end of the filter unit, thus increasing the turbulence within the filter 16 itself. This particular divider arrangement and configuration not intended to be a limitation, but is merely shown as the preferred embodiment and configuration for obtaining and providing the desired advantages of the present invention. Other configurations are also possible and the complete absence of dividers and the mere provision of biological filter material within the plenum passageway may also be utilized according to the needs and necessities of the user.

In the preferred embodiment, the filter media 17 that is used is a shredded plastic material preferably of a plastic such as the type PETE similar to the plastic found in plastic soda pop bottles. This plastic material is cut and cross corrugated in one half inch strips of various lengths. While these dimensions have been utilized in the present invention, it is to be distinctly understood that the invention is not limited thereto but may be variously embodied to contain additional features beyond these that have been described. In the preferred embodiment of the invention, this process of cutting and folding the plastic strips to provide various surfaces for contact is provided by a mechanized device having a variety of blades and pressing devices. However, it is to be distinctly understood that a variety of ways may be utilizes for achieving this result and forming this plastic frass filter material.

This plastic frass provides several advantages. First, this material provides a porous location with a large amount of surface area, which provides a location for nitrifying bacteria to colonize and spread. This spreading action provides that increased amounts of nitrifying bacteria are available contact with the water and increases the rates of reaction and the efficacy of the nitrification process. This filter media 17 also is moveable and affected by the flow of water current through the filter, as a result the filter media moves sloughing off the dead and dying bacteria. Additionally, this movement of the filter media allows for mechanical breakdown of particulate matter particularly the calcareous algae, which exist in the pond.

This mechanical action also functions to cut the bubbles caused by the injection of air into the water, by the venturi (shown in FIG. 5), thus causing the size of the air bubbles to be decreased and the quantity of air within the water to be increased. This plastic frass filter material 17 also provides an area where air bubbles can accumulate. When the filter media is upset, this air is then released back into the water. The constancy of this cycle occurring and reoccurring allows air bubbles to accumulate and be released, thus allowing the quantity of dissolved oxygen to be held at a rate that is generally constant and which is greater than other methods and devices that are found in the prior art. These features cause the amount of dissolved oxygen and nutrient levels in the water to be increased and allows for improved life sustaining qualities within the pond itself. This feature also prevents material from collecting and sinking to the sides or bottom of the pond and removes potentially harmful material from the pond system.

The positioning of various channels 48 within these filter chamber walls 50 provide a variety of advantages by modifying the flow of water through the filter. The placement of these walls 50 provides obstacles to the flow of fluid through the device. As a result of these obstacles, the flow of water through the device reverses itself at times, flows backwards, and forms eddies and counter currents. The effect of these counter currents is to move and jostle the plastic frass filter media 17 in such a way whereby less vigorous bacterial organisms are knocked loose from their sites of colonization upon the shredded soda bottle media, and mechanical breakdown and mixing of material into the water takes place. This also results in more of the nitrate-laden water being passed over the nitrate consuming and fixing bacteria and increasing the rates of nitrification within the system. In addition, in some configurations the plastic frass material 17 may be electrically charged so as to increase the efficacy of the frass 17 and the filter 16 in attracting and holding material against the filter 16.

While the present description discusses the plenum 14 and the filter 16 as a part of a kit or combination, it is expressly envisioned that the present invention could be separated into individual components for use together with existing pond structures. For instance, the plenum 14 and filter 16 units could be inserted with an existing pond liner as long as the plenum 14 is shaped to fit within the pond. Additionally, the filter 16 and pre-filter 22 assemblies of this invention could be utilized with existing pond set-ups, as replacement parts or as modifications to improve the function of these ponds and tanks.

The flow of water in to the plenum 14 and through the filter 16 is made possible by a pump 18. In the preferred embodiment, pump 18 is an environmentally friendly pump 18 that contains provisions so that in the event of a leak of lubricating fluid, the life within the pond will not be killed. The size of the pump 18 varies according to the necessities of the user. However, in this case a 110-gallon per minute pump is utilized with a pond that contains between 300 and 350 gallons. This general ratio of pump size to tank capacity is thought to be the preferred ratio for accomplishing these results. This pump 18 is connected to the plenum 18 through a U-shaped tube 56 that is configured for insertion within a specifically designed portion of the plenum 58. The pump 18 is properly grounded and electrically insulated for use in an aquatic environment. In the preferred embodiment, the pump 18, pre-filter 22, and the filter 16 are preassembled and connected so as to allow for ease of operation and placement. Preferably, the intake portion of the pump 60 is connected to a canister filter 20 through a U-tube 56, which is configured to fit within the appropriately shaped portion of the plenum 58. This canister filter 20 contains a so-called "turbo filter," which is configured to fit within a footprint 58 defined within the plenum 14 and provides suctioning power capable of 110 gallons per minute. This "turbo filter" is made up of a cylinder shaped canister 20 and a skimmer 22. These pieces all separate material from the liquid and allow the liquid to be appropriately passed through the pond 44 or the plenum 14. This device is also filled with aluminum frass 62 (chewed up soda pop cans) filter material. By pre-filtering all water through this filter 20 prior to passage over the large filter 16 located in the plenum 14, the water is kept more clean and bacteria algae and water product free. This pre-filter 22 is a significant improvement over other forms of similar products that are found in the prior art.

The input of water into the pump 18 is drawn through this turbo filter 22 prior to passage into the pump 18 itself. The pre-filter 22 and skimmer is housed within a canister 20, which has one side defining a plurality of holes in specific pattern. In use, this canister and pump are placed below the surface of the pond. These holes in the canister form openings through which water is drawn into the canister. On the inside of the canister a screen is placed to prevent the passage of large materials into the canister. Within the canister 20 a coiled passageway 24 filled with a filter material 26 is connected to these openings. This coil 24 provides a path through which water will travel until terminating in an exit tube 64 which is connected to the input portion 60 of the pump 18. This exit tube 64 also has an open end 66, which is configured to directly introduce water into the pump 18. When the pump 18 is activated, approximately 85 percent of the water that passes through the pump 18 enters through the circular path 24 in the canister 20 and approximately 15 percent enters through the exit tube 64 directly. The top of the exit tube 64 has a mesh screen 68 similar to a colander and keeps large material from entering into the pump 18. The filter material 26 in the circular path 24 contains an aluminum frass, made of shredded and folded aluminum pieces. The force of water through this frass 26 causes the cutting and mechanical breakdown of materials such as filamentous algae and other pieces of vegetable matter that may get sucked into the pre-filter 22. This turbo-filter is preferably made of stainless steel, however it may be made of other materials as well.

After water has passed through this pre-filter 22, it enters the pump 18 and is discharged through the exit side 70 of the pump 18. At this discharge 70, the water is split into two directions. One part of the water (approximately 40%) is pumped either directly into the plenum 14 or to a waterfall feature. The other sixty percent of the water discharged from the pump 18 is sent to a mixing device and a venturi 72 which mixes air with the water and discharges this aerated water into the filter 16. The water then passes through the filter medium 17 and is allowed to discharge and rise into the pond portion 44 above the cover 34.

The size of the pump 18 in relation to the capacity of the entire tank allows the entire volume of the pond to the run through the filter system about 5 times an hour. This repeated filtration coupled with the increased quantities of oxygen allows for increased vibrant organic activity and allows the pump 18 to clean itself with little or no maintenance. While nitrifying bacteria are suggested as being added to the system on initial set up, in some applications persons have been able to simply utilize the naturally occurring bacteria that accompany fish and plants to function within the system.

Figure 5:
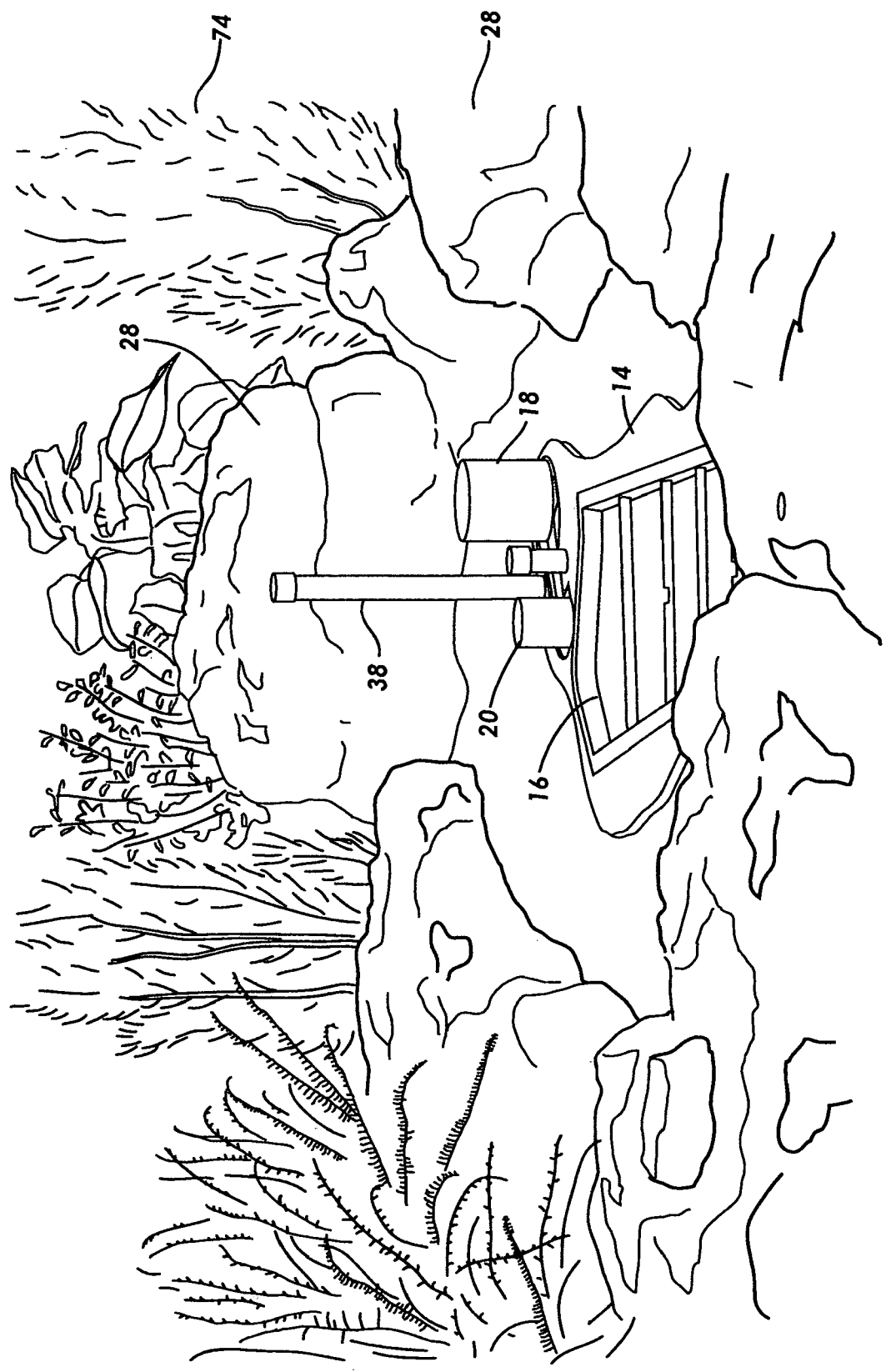
FIG. 5 shows a view of the present invention with the pump, venturi, and pre-filter canister in place.
Figure 6:
FIG. 6 shows a view of the present invention with water in place within the pond.
Figure 7:
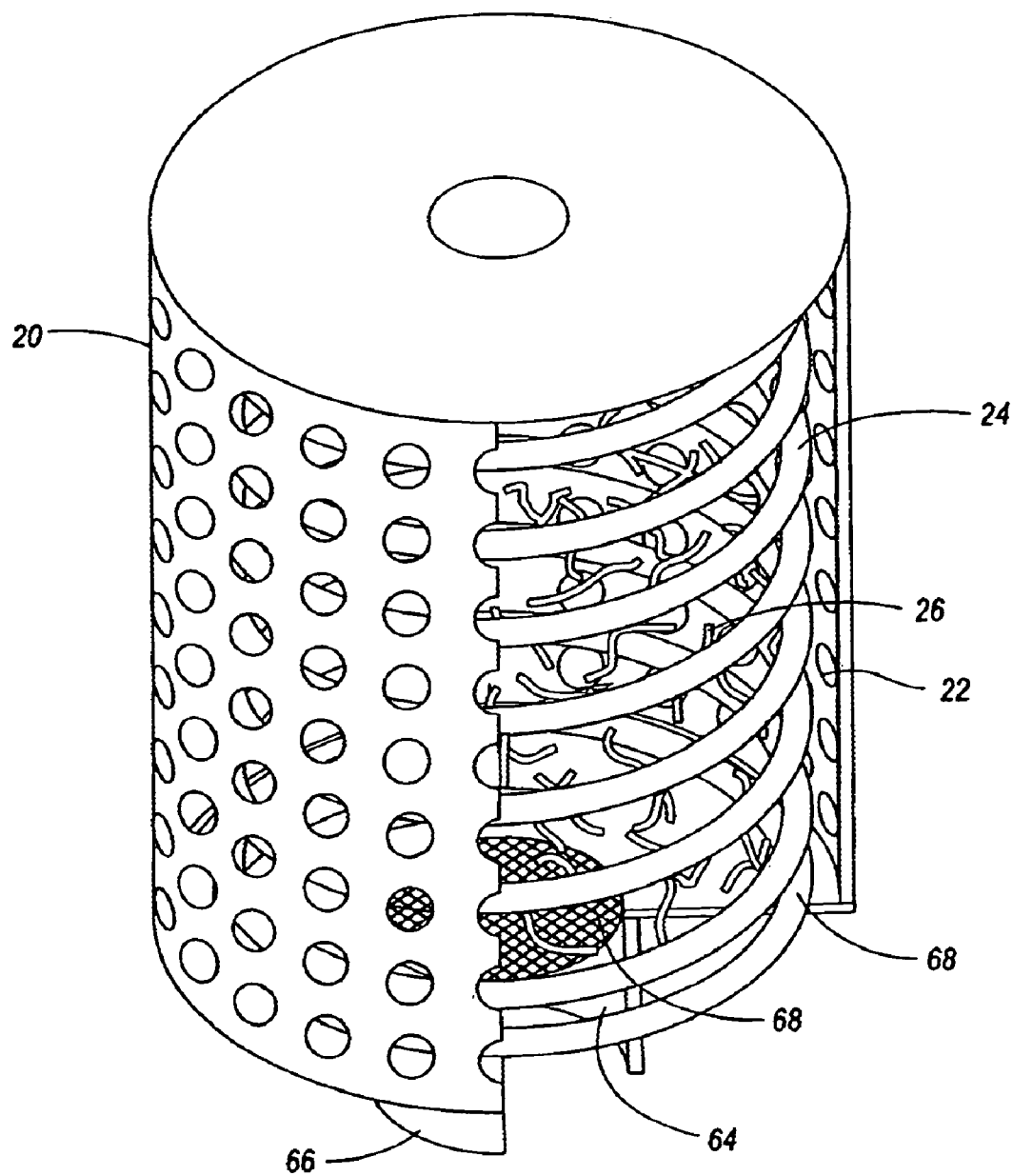
FIG. 7 is a detailed cut away view of the pre-filter canister of the present invention.

FIG. 5 is a view of the present invention without any water in place. At one end of the pond 44 is an aperture configured to provide water to a waterfall or other structure. Because the body of the plenum 14 contains a conduit that contains water being pressurized by the pump 18 (preferably after it is pumped through a canister filter), a user would be able to create a hole anywhere within the plenum 18 or conduit to supply pressurized fluid to other water effects, such as fountains, waterfalls, etc. In the preferred embodiment, a gravel substrate is positioned in the pond over the cover 34. Such a configuration further enhances the natural filtration and regulation system that exists in this device.

The present invention also contains artificial rock 28 features that provide a variety of aesthetic and functional features to the pond set up. The artificial rocks 28 in the present invention are formed utilizing high quality resins and crushed stone pieces and aggregate in a process that produces artificial stones that are significantly less heavy than natural stones and which contain water flow features which are desirable. All of the plastics and stones in the present invention are formulated to be stabilized to resist oxidation and degradation by UV light, whether by free light radicals or hindered amines. These stones 28 are configured so that large stones have significantly reduced weights as compared to natural stone, thus allowing the heaviest stones in the device to be moveable without the use of heavy equipment. For example, an artificial stone having the dimensions of being 48 inches by 18 inches by 36 inches still weighs less than 80 pounds, while a natural stone having the same dimensions could weigh ten to fifteen times this much. The overall weight of this kit is three to five hundred pounds while a similar arrangement of natural materials would be significantly heavier The stones 28 and the liner 12 of the present invention provide several desired features. One feature is the existence of a so-called Zen stone. This Zen stone is configured to provide a location for a person to sit wherein they may also have contact with running water so as to provide desired meditative qualities. The present invention also includes a stone that projects out over the water and provides shelter for fish habitat including a spawning area. The pond liner as well as the inserts and gravel which may be put into the pond also provide shelves, overlooks grottos wherein a party can place their feet within the water and feed fish which swim around their feet or engage in similar activities.

The present invention also further includes fiber optic lighting 32, which can be utilized in a variety of locations including the stones, the inner portions of the pond or the water features as well as various modifications of these items. These lights can be modified to demonstrate various colors and provide a system for lighting that is much safer than other methods and devices that are shown in the prior art. This fiber optic system 32 is drastically improved over the prior art because it is substantially easier to use and install as compared to other devices and features that exist in the prior art. This allows the present system to be utilized without much additional effort. A number of fiber optic cables are configured for attachment to and through the rockwork so that they can be focused throughout the pond assembly for providing lighting and lighting accent to the assembly.

The end result of such an invention is an improved pond installation and pond installation kit that can be placed within a desired location and assembled quickly and easily by persons with limited knowledge of the pond plumbing devices. What is further provided is a pond with a plenum that provides increased biological filtration and pressurized filtered water in a recirculating type pond pump system.

The present invention provides for all of the above-mentioned features and does so in a way that is self-plumbing. Once a user drops the pond into a hole and attaches the plenum within the plenum chamber in the bottom of the pond, the user merely needs to set the preassembled pump and filter combination into the desired and preformed positions, install the rocks around the rim, power the pump, and the pond is installed and ready to go without additional plumbing or work on the part of the user. As has been discussed previously, the filter system of the present invention requires little or no follow up maintenance.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. A system for installing artificial decorative water ponds, said system comprising:
    a preformed pond liner configured to provide a self-contained pond having a preselected volumetric capacity;
    a plenum made from a semi-rigid material and having a fixed size configured to fit within said preformed liner, said plenum configured to receive water from a pump and to hold water in a pressurized state so as to provide a reservoir of pressurized water to a pond located above said plenum;
    an underwater filter adapted to fit within said plenum, said underwater filter defining a plurality of interconnected chambers each of said interconnected chambers filled with a shredded plastic frass filter media containing said underwater filter configured to transmit water to said pond; and
    a pump; said pump interconnected to a pre-filter located within a canister, said pump and pre-filter operatively connected to pump water into said plenum and configured to circulate water through said plenum, and said pond.

2. The system of claim 1 wherein said canister filter includes a generally coiled passageway.

3. The system of claim 2 wherein said generally coiled passageway is filled with a shredded frass filter medium.

4. The system of claim 1 further comprising at least one artificial rock configured for connection with the rim of said pond, said artifical rock made from a combination of resins and crushed stone, said artificial rock having a weight of approximately one third of a natural stone of the same size.

5. The system of claim 4 further comprising a plurality of fiber optic lights connected within said artificial rock and surrounding said pond.

6. The system of claim 1 wherein said pump has a capacity of approximately one third the capacity of the pond liner.

7. The system of claim 1 further comprising a venturi configured to mix air with water prior to the flow of said water through said filter.

8. The system of claim 1, wherein said preformed pond liner is made from a green UV stabilized plastic material that is formulated to provide protection against various forms of plastic oxidation and breakdown including free-light radicals and hindered amines.

9. The system of claim 8, wherein said preformed pond liner has a thickness of approximately ⅜ of an inch.

10. The system of claim 1, wherein said shredded plastic frass filter media is a plurality of shredded folded plastic bottle portions having a relatively light weight, a desired static charge, generally flat surface area portions to allow colonization of bacteria thereupon and sharp edge portions configured to mechanically cut and grind algae within the decorative pond system.

* * * * *